INVENTOR
W.O. SCHELLENBERG

Jan. 9, 1968   W. O. SCHELLENBERG   3,362,132
PRESSURE RESPONSIVE METHOD FOR DEAERATING WATER
Filed Jan. 21, 1965   2 Sheets-Sheet 2

INVENTOR
W.O. SCHELLENBERG
BY Young and Quigg
ATTORNEYS

United States Patent Office 3,362,132
Patented Jan. 9, 1968

3,362,132
PRESSURE RESPONSIVE METHOD FOR
DEAERATING WATER
Walter O. Schellenberg, Sweeny, Tex., assignor to Phillips
Petroleum Company, a corporation of Delaware
Filed Jan. 21, 1965, Ser. No. 426,869
6 Claims. (Cl. 55—21)

This invention relates to the deaeration of water. In one aspect, this invention relates to a method for utilizing steam condensate to deaerate water which can be used as feed to a boiler or the like. In another aspect, this invention relates to a control system for regulating the condensation of steam which is in admixture with water to form a water condensate having a reduced quantity of entrained air.

Steam condensate is conventionally recovered from heaters, reboilers, and the like by using a gathering system which functions to transmit the condensate to a zone of reduced pressure and reduced temperature wherein the condensate is flashed to vapor. Cold water is normally passed into admixture with the steam produced in the zone of reduced pressure to effect a heat exchange between the produced steam and the cold water such that the steam condenses to water and the cold water becomes heated. The water including that formed by condensing the steam can then be removed from the zone of reduced pressure and used as boiler feed water or the like. A shortcoming of major concern inherent with this type of system is that air becomes entrained in the water removed from the zone of reduced pressure. This is undesirable when the water is to be used as boiler feed or the like because the presence of the oxygen in the air entrained in the water can cause severe corrosion of metal surfaces including the boiler tubes and connecting conduits. The oxygen in the water also results in the formation of iron oxide deposits on the surfaces of the boiler tubes. These deposits not only restrict the flow through the boiler tubes, but they also reduce the transfer of heat to the water passing through the boiler.

According to this invention, these and other disadvantages of the prior art for recovering steam condensate and forming water which can be used as boiler feed are overcome by providing a method and apparatus which will function to form water having a reduced quantity of entrained air. This is accomplished by providing a tank which serves to receive steam condensate from a steam condensate gathering system. The tank is operated at a temperature and pressure less than that of the steam condensate thereby allowing the condensate to be flashed to produce steam as it enters the tank. Cold water which may contain entrained air is sprayed into the tank into admixture with the steam. This results in a transfer of heat from the produced steam to the cold water such that the water becomes heated and the greater portion of the steam condensed to liquid. The water including that obtained by condensing the steam will collect in the bottom of the tank such that it can be removed and utilized as boiler feed or the like. The remaining uncondensed portion of steam is passed from the tank as vapor. Air is prevented from becoming entrained or dissolved in the water collected in the bottom of the tank, in accordance with this invention, by maintaining the water substantially at its boiling point within the tank. This will allow the entrained air including free oxygen to be liberated from the water and passed from the tank with the uncondensed portion of steam. The water within the tank is maintained at or near its boiling point by controlling the rate of flow of cold water passing into the tank in response to the uncondensed portion of steam within the tank. In one embodiment of the invention, the rate of flow of cold water entering the tank is controlled in response to the pressure generated by the uncondensed portion of steam in the tank. In another embodiment of the invention, the rate of flow of cold water entering the tank is controlled in response to the rate of flow of the uncondensed portion of steam passing from the tank as vapor. In either embodiment, it is apparent that by controlling the rate of flow of cold water passing into admixture with the produced steam in response to the uncondensed portion of the steam, the temperature of the water collected in the bottom of the tank can be controlled for different rates of flow of steam condensate passing into the tank.

Accordingly, it is an object of this invention to provide a method for removing entrained air from water.

Another object of this invention is to provide a method for forming water having a reduced quantity of entrained air.

Still another object of this invention is to provide a control system for controlling the rate of flow of water to a flash zone responsive to the conditions within the flash zone to reduce the quantity of entrained air in the water in the flash zone.

A further object of this invention is to provide a method for using steam condensate to remove entrained air from water.

These and other objects of the invention will become apparent to one skilled in the art after studying the detailed description, the appended claims, and the accompanying drawings in which:

Figure 1:
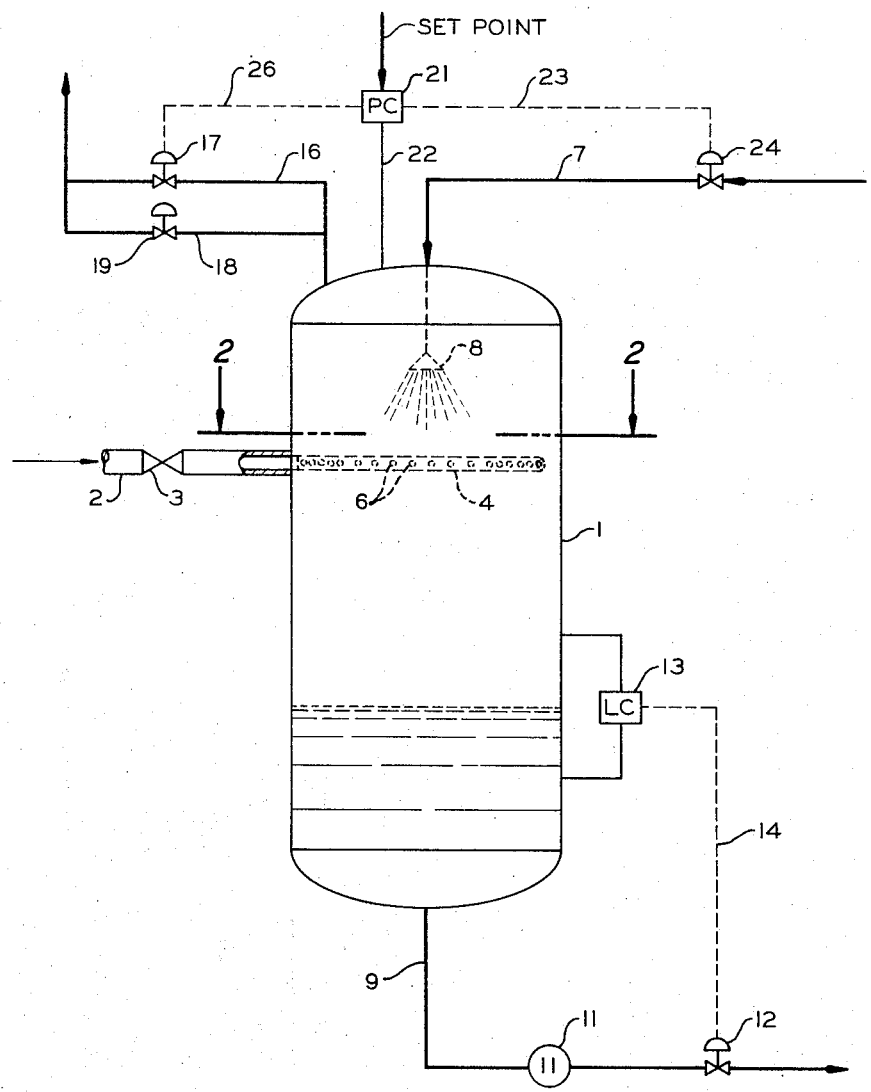
FIGURE 1 is a partially broken side elevation of an apparatus illustrating one embodiment of the invention.

Referring now to the drawings, wherein like reference numerals are used to denote like elements, the invention will be described in more detail. Many valves, compressors, control apparatus, etc., not necessary in explaining the invention to one skilled in the art, have been omitted from the drawings for the sake of clarity.

Figure 2:
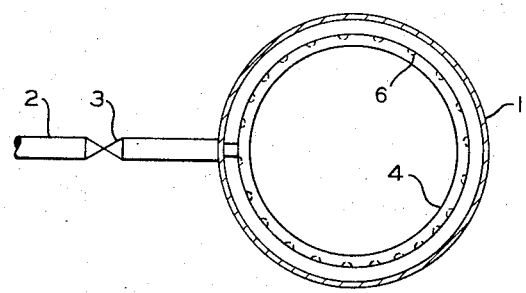
FIGURE 2 is a cross-section taken along the line 2—2 of FIGURE 1.

In FIGURES 1 and 2, a tank 1 is provided with a conduit 2 having a pressure reducer 3 which will serve to transmit steam condensate from a gathering system or the like into tank 1. A hollow ring 4 having a plurality of circumferentially spaced apertures 6 is attached to conduit 2 and disposed within tank 1 such that it will serve to distribute the steam after it has been produced from the steam condensate transmitted into tank 1 by means of conduit 2. A water feed conduit 7 having a spray head 8 is connected to tank 1 such that the spray head is positioned adjacent the hollow ring 4. This will serve to allow cold water to be passed into the tank 1 such that the water can be sprayed into admixture with the stream issuing from the apertures 6. The cold water will condense the produced steam to liquid. The water including the condensate thus formed from the produced steam will collect in the bottom portion of the tank 1. This water can be removed from tank 1 by means of a conduit 9 having a pump 11. A motor valve 12 operatively connected to a liquid level sensing device 13 by means of a conductor 14 will serve to regulate the removal of water from tank 1. The liquid level senser 13 and motor valve 12 can be of any suitable type well known in the art. The pump 11 is preferably of the centrifugal action type because it can then be allowed to run continuously without danger of increasing the fluid pressure in conduit 9 when the motor valve 12 is in the closed position.

Since, in accordance with this invention, it is necessary to maintain the water within tank 1 at or near its boiling point at all times to allow air to be liberated from it, it is necessary to vent a controlled quantity of steam from tank 1 at all times. This is accomplished by providing a steam conduit 16 and a by-pass conduit 18 having a valve 19 which can be adjusted to allow a controlled quantity of steam to be vented from tank 1. Since the quantity of uncondensed steam passing from tank 1 through conduits 16 and 18 is dependent upon the relative quantities and temperatures of the steam condensate and cold water passing into tank 1, these quantities can be varied to control the quantity of steam being vented from tank 1. Thus, if the quantity of steam condensate increases relative to the quantity of cold water, the quantity of uncondensed steam in the tank 1 will be increased. Conversely, if the quantity of cold water passing into tank 1 is increased relative to the quantity of steam condensate, the quantity of steam formed in tank 1 will be less, and all of the steam in tank 1 can be condensed to liquid and collected in the bottom. The latter situation is undesirable because when steam is not being passed from tank 1, the temperature of the liquid in tank 1 has been lowered below its boiling point and any entrained air or dissolved air will remain in the water passing from tank 1 by means of conduit 9.

The temperature of the water within tank 1 is controlled, in accordance with this embodiment of the invention, by regulating the rate of flow of cold water to tank 1 in response to the quantity of uncondensed steam in tank 1. This is accomplished by utilizing a split range pressure controller 21, of a type such as that described by the Foxboro Company in Bulletin 5A–10A, operatively connected to tank 1 by means of a pressure conduit 22. A control line 23 is operatively connected to the pressure controller 21 and a motor valve 24 in conduit 7 for regulating the rate of flow of cold water through conduit 7 in response to a signal received from the pressure controller. A second control line 26 is operatively connected to the pressure controller 21 and a motor valve 17 in steam conduit 16. The pressure controller 21 is set to open motor valve 24 in response to an increase in pressure within tank 1 occasioned by an increase in the quantity of uncondensed steam therein. This will cause an increase in the rate of flow of cold water passing into tank 1 thereby increasing the quantity of steam which is condensed. If the pressure continues to rise above a preset value in tank 1, the pressure controller 21 will function to transmit a signal to motor valve 17 by means of conduit 26 such that valve 17 will be opened thereby allowing additional steam to be vented from tank 1 thus relieving the excessive pressure.

In the operation of this embodiment of the invention, steam condensate is passed into tank 1 by means of conduit 2 and pressure reducer 3 whereupon the condensate is flashed to steam due to the reduction in pressure within tank 1. Cool water such as boiler feed make-up water or the like is introduced into tank 1 through spray head 8 by means of conduit 7. The direct contact heat exchange which is effected between the produced steam and the cool water in tank 1 will serve to raise the temperature of the water and to condense a portion of the steam to liquid. The water including the condensate thus formed will pass downward in tank 1 and collect such that it can be removed through conduit 9 by means of pump 11 in response to the position of motor valve 12. Valve 19 is given an adjustment which will allow a small amount of steam to pass from tank 1 through conduit 18 at all times. This will insure that the water in the bottom of tank 1 is at or near its boiling point. When the rate of flow of the steam condensate in conduit 2 is increased, the quantity of uncondensed steam in tank 1 will likewise increase because of the increase in heat carried into tank 1. As the quantity of uncondensed steam increases in tank 1 the pressure will similarly increase. The pressure controller 21, upon sensing this increase in pressure in tank 1, will pass a signal to valve 24 which causes it to open further thereby increasing the rate of flow of cold water through conduit 7. The additional water entering tank 1 will serve to condense the steam which caused the pressure increase thereby returning the system to its normal operating condition. In the event that the rate of flow of the steam condensate increases to a value such that the quantity of cold water is being passed into tank 1 at its maximum and the pressure continues to rise, the pressure controller will serve to pass a signal to motor valve 17 to move it to its open position thereby allowing the additional uncondensed steam to be removed from tank 1. This arrangement will prevent the pressure in tank 1 from ever exceeding a safe working level.

Figure 3:
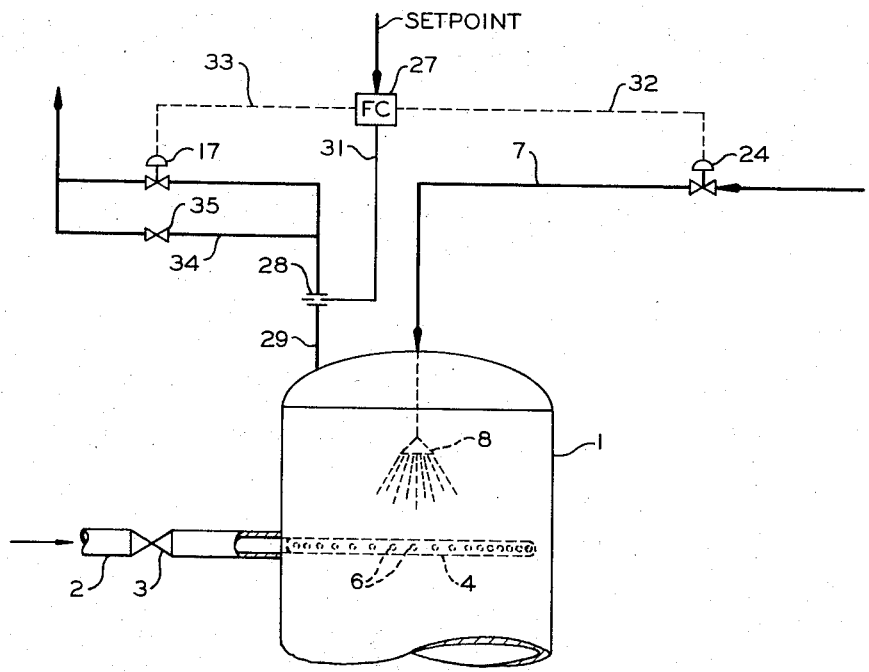
FIGURE 3 is a partially broken side elevation illustrating an apparatus in accordance with another embodiment of the invention.

Referring now to FIGURE 3 of the drawings, which illustrates another embodiment of the invention, tank 1 is provided with steam condensate conduit 2 and cold water conduit 7 including the spray head nozzle 8. In accordance with this embodiment of the invention, the liquid within tank 1 is maintained at or near its boiling point in response to the rate of flow of the uncondensed steam passing from tank 1. A flow controller 27 of a type well known in the art is operatively connected across an orifice plate 28 in steam vent conduit 29 by means of a control line 31. Motor valve 24 in conduit 7 is operatively connected to the flow controller 27 by means of a suitable control line 32. Motor valve 17 in steam vent conduit 29 is operatively connected to the flow controller 27 by means of a suitable control line 33. A steam by-pass conduit 34 having a valve 35 serves to allow a controlled quantity of steam to be passed from tank 1 at all times.

In the operation of this embodiment of the invention, steam condensate is flashed into tank 1 by means of the hollow ring 4 whereupon it is contacted with cold water issuing from spray head 8. A controlled quantity of steam is passed from tank 1 by means of steam conduit 29 and by-pass conduit 34 in response to the setting of valve 35. This will allow the water to be maintained at or near its boiling point at all times within tank 1. When the quantity of steam condensate passing to tank 1 increases, the quantity of uncondensed steam passing from tank 1 by means of conduit 29 increases a corresponding amount. The orifice unit 28 in conduit 29 will establish a condition responsive to the increase in the flow rate of steam. This condition is sensed by flow controller 27 by means of control line 31. The flow controller 27 will pass a signal to motor valve 24 responsive to the condition across the orifice unit 28 to cause valve 24 to open further thereby increasing the rate of flow of water to tank 1. The cooling effect obtained by the increased quantity of cold water will serve to condense the excess steam which has been formed in tank 1 such that the rate of flow of steam from tank 1 through conduit 29 will be decreased to the original rate of flow. If the rate of flow of the steam condensate increases to a level such that the cold water entering the tank is at a maximum and the rate of flow of steam in conduit 29 remains above the desired level, the flow controller 27 will serve to transmit a signal to motor valve 17 by means of control line 33 whereupon the motor valve 17 will open thereby allowing the excess steam to be removed from tank 1. This arrangement will serve to accommodate the increased quantity of steam formed in tank 1 such that the pressure in tank 1 is prevented from exceeding a safe working level.

The following example will serve to further illustrate the invention. It is to be understood that this example is for the purpose of illustration only and that many modifications and variations can be made by one skilled in the art without departing from the spirit and scope of the invention.

*Example*

Steam condensate at a temperature of 254° F. and a pressure of 17.3 p.s.i.g. was passed into tank 1 by means of conduit 2 at a rate of 496 g.p.m. Water at a temperature of 75° F. and a pressure of 60 p.s.i.g. was passed into tank 1 by means of conduit 7 at a rate of 200 g.p.m. The oxygen content of the water entering tank 1 by means of conduit 7 was tested and determined to be 3 p.p.m. The tank 1 was operated at a temperature of 222° F. and a pressure of 3.3 p.s.i.g. The controlled quantity of steam vented from tank 1 by means of conduits 16 and 18 was 27,600 pounds per day at a temperature of 222° F. These conditions resulted in the collection and removal of 694 g.p.m. of water at a temperature of 222° F. from tank 1 by means of conduit 9. The oxygen content of the water removed by means of conduit 9 was tested and found to be 0.45 p.p.m. It can thus be seen that the oxygen content of the water was reduced from 3 p.p.m. to 0.45 p.p.m. in the practice of this invention.

The pressure controller 21 is preferably given a set point which will cause valve 24 to move to a more open position in response to a pressure increase in tank 1 within the range of from about 3 to 5 p.s.i.g. The pressure controller 21 will thus serve to regulate the quantity of cold water passing into tank 1 by means of conduit 7 to maintain the pressure in tank 1 at about 3 p.s.i.g. When the pressure increases to 5 p.s.i.g. in tank 1, the motor valve 24 will be in its fully open position. A second set point on the split range pressure controller 21 will serve to cause a signal to be passed to motor valve 17 in steam vent conduit 16 by means of pressure control line 26 in response to a pressure increase in excess of 5 p.s.i.g. in tank 1. The upper limit of the second set point given the pressure controller 21 is preferably 7 p.s.i.g. Thus, when the pressure in tank 1 increases above 5 p.s.i.g., valve 17 will begin to open and when the pressure reaches 7 p.s.i.g. the motor valve 17 will be in its fully open position.

It will be evident to those skilled in the art that the invention is not limited to any specific set of operating conditions. Different situations will dictate the actual operating temperatures and pressures which are desired for a particular system.

While the invention has been described in connection with the use of a single pressure controller for regulating the position of the valve in the cold water conduit and the valve in the steam vent conduit, it is apparent that separate pressure controllers could be installed for performing each of these functions separately. Similarly, it is apparent that one flow controller could be used to control the position of the motor valve regulating the rate of flow of cold water to tank 1 in response to the rate of flow of uncondensed steam and another flow controller could be used to control the position of the motor valve which regulates the steam passing from tank 1. It is obviously preferred for economic reasons to use a single pressure controller or flow controller for performing both of these functions.

Although the invention has been described in considerable detail, it is to be understood that such detail is for the purpose of illustrating the invention and that many variations and modifications can be made by one skilled in the art without departing from the spirit and scope thereof.

I claim:

1. A method of deaerating water comprising passing steam condensate into a flash zone to vaporize said condensate to form steam; passing water to be deaerated into said flash zone into admixture with said steam to raise the temperature of said water and to condense a portion of said steam to liquid; passing the remaining uncondensed portion of said steam from said flash zone as vapor; establishing a signal responsive to the uncondensed portion of said steam; controlling the rate of flow of said water passing to said flash zone responsive to said signal to bring the water resulting from said admixture of said steam and said water to substantially its boiling point and maintain said water resulting from said admixture substantially at its boiling point; and removing water having a reduced quantity of entrained air from said flash zone.

2. A method according to claim 1 wherein said signal is established in response to the pressure generated by the uncondensed steam in said flash zone.

3. A method according to claim 1 wherein said signal is established in response to the rate of flow of said steam passing from said flash zone.

4. In a method of deaerating water including the steps of passing water to be deaerated into a flash zone, passing steam into said flash zone into admixture with said water to raise the temperature of said water and to condense a portion of said steam to liquid, passing the remaining uncondensed portion of said steam from said flash zone as vapor, and removing water having a reduced quantity of entrained air from said flash zone, the improvement comprising establishing a signal responsive to the uncondensed portion of said steam; and controlling the rate of flow of said water passing to said flash zone responsive to said signal to bring the water resulting from said admixture of said steam and said water to substantially its boiling point and maintain said water resulting from said admixture substantially at its boiling point.

5. A method according to claim 4 wherein said signal is established in response to pressure generated by the uncondensed steam in said flash zone.

6. A method according to claim 4 wherein said signal is established in response to the rate of flow of said steam passing from said flash zone.

References Cited

UNITED STATES PATENTS

| | | | |
|---|---|---|---|
| 2,343,317 | 3/1944 | Olson | 55—194 |
| 2,515,649 | 7/1950 | Hunt et al. | 55—194 |
| 2,955,673 | 10/1960 | Kennedy et al. | 55—163 |
| 3,144,036 | 8/1964 | Rice | 137—14 |
| 3,183,645 | 5/1965 | Teller | 55—21 |
| 3,241,295 | 3/1966 | Griffin et al. | 55—193 |

FOREIGN PATENTS 527,204    10/1940    Great Britain.

SAMIH N. ZAHARNA, *Primary Examiner.*

REUBEN FRIEDMAN, *Examiner.*

C. N. HART, *Assistant Examiner.*